US012615643B2

(12) United States Patent
Hwang et al.

(10) Patent No.: US 12,615,643 B2
(45) Date of Patent: Apr. 28, 2026

(54) DEVICE AND METHOD FOR FRONTHAUL TRANSMISSION IN WIRELESS COMMUNICATION SYSTEM

(71) Applicant: Samsung Electronics Co., Ltd., Suwon-si (KR)

(72) Inventors: Wonjun Hwang, Suwon-si (KR); Daehoon Kim, Suwon-si (KR); Bongjin Kim, Suwon-si (KR); Kyungsik Min, Suwon-si (KR); Byoungyoon Min, Suwon-si (KR); Moongun Song, Suwon-si (KR); Jongho Oh, Suwon-si (KR); Hyoungjin Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 18/184,221

(22) Filed: Mar. 15, 2023

(65) Prior Publication Data

US 2023/0224919 A1     Jul. 13, 2023

Related U.S. Application Data

(63) Continuation of application No. PCT/KR2021/012893, filed on Sep. 17, 2021.

(30) Foreign Application Priority Data

Sep. 17, 2020     (KR) ........................ 10-2020-0120141

(51) Int. Cl.
    *H04W 72/23*     (2023.01)
    *H04B 7/06*      (2006.01)
(52) U.S. Cl.
    CPC .......... *H04W 72/23* (2023.01); *H04B 7/0617* (2013.01)

(58) Field of Classification Search
    CPC ............................ H04W 72/23; H04B 7/0617
    See application file for complete search history.

(56) References Cited

U.S. PATENT DOCUMENTS

| | | | |
|---|---|---|---|
| 9,397,795 B2 | 7/2016 | Choi | |
| 10,666,350 B2 | 5/2020 | Chang et al. | |

(Continued)

FOREIGN PATENT DOCUMENTS

| | | |
|---|---|---|
| CN | 111373835 A | 7/2020 |
| KR | 10-2005-0087177 A | 8/2005 |

(Continued)

OTHER PUBLICATIONS

O-RAN Fronthaul Working Group; Control, User and Synchronization Plane Specification, O-RAN.WG4.CUS.0-V04.00 Jul. 1, 2020, pp. 1-258, XP009534606.

(Continued)

*Primary Examiner* — Joseph E Avellino
*Assistant Examiner* — Maryam Emadi
(74) *Attorney, Agent, or Firm* — Jefferson IP Law, LLP

(57)     ABSTRACT

The disclosure relates to a $5^{th}$ generation (5G) or pre-5G communication system for supporting a higher data transmission rate than a $4^{th}$ generation (4G) communication system such as long term evolution (LTE). A method performed by a digital unit (DU) of a base station in a wireless communication system is provided. The method includes configuring, in a first control message, a section extension field including additional information, and transmitting the first control message to a radio unit (RU) of the base station, wherein the first control message includes information on one or more terminals scheduled in the base station.

18 Claims, 11 Drawing Sheets

(56) References Cited

U.S. PATENT DOCUMENTS

| | | |
|---|---|---|
| 2015/0195024 A1 | 7/2015 | Kim et al. |
| 2016/0373177 A1 | 12/2016 | Inakoshi et al. |
| 2018/0103428 A1* | 4/2018 | Jiang ................. H04W 52/0225 |
| 2019/0020392 A1 | 1/2019 | Butler et al. |
| 2019/0036583 A1 | 1/2019 | Cherian et al. |
| 2019/0289497 A1 | 9/2019 | Rajagopal |
| 2020/0028611 A1* | 1/2020 | Lee .......................... H04J 99/00 |
| 2021/0099974 A1* | 4/2021 | Wu ....................... H04L 5/0055 |
| 2022/0069878 A1* | 3/2022 | Schuh ................. H04B 7/0617 |

FOREIGN PATENT DOCUMENTS

| | | |
|---|---|---|
| KR | 10-2014-0077728 A | 6/2014 |
| KR | 10-2017-0081155 A | 7/2017 |
| KR | 10-1791209 B1 | 11/2017 |
| KR | 10-2019-0048787 A | 5/2019 |
| WO | 2014/007591 A1 | 1/2014 |
| WO | 2020/109892 A1 | 6/2020 |
| WO | 2020/110005 A1 | 6/2020 |
| WO | 2020/119910 A1 | 6/2020 |

OTHER PUBLICATIONS

European Search Report dated Feb. 15, 2024, issued in European Application No. 21869812.4.
O-RAN Fronthaul Working Group Control, User and Synchronization Plane Specification, O-RAN.WG4.CUS.0-v03.00.
International Search Report dated Dec. 20, 2021, issued in International Application No. PCT/KR2021/012893.
Korean Office Action dated Sep. 16, 2025, issued in Korean Patent Application No. 10-2020-0120141.
European Office Action dated Nov. 24, 2025, issued in European Patent Application No. 21869812.4.
Chinese Office Action dated Dec. 5, 2025, issued in Chinese Patent Application No. 202180063871.6.
Korean Notice of Patent Grant dated Feb. 24, 2026, issued in Korean Patent Application No. 10-2020-0120141.

\* cited by examiner

START

RECEIVE INFORMATION REQUIRED TO
CALCULATE BEAMFORMING WEIGHT ~610

OBTAIN BEAMFORMING WEIGHT ~620

APPLY BEAMFORMING TO
TRANSMISSION DATA ~630

END

| 0 (msb) | 1 | 2 | 3 | 4 | 5 | 6 | 7 (lsb) | # of bytes | |
|---------|---|---|---|---|---|---|---------|------------|--|
| ef | extType = 12 | | | | | | | 1 | Octet M |
| extLen = 0x01 (1 word) | | | | | | | | 1 | M+1 |
| nullDimensionInd | | | | | | | | 1 | M+2 |

FIG.7

| 0 (msb) | 1 | 2 | 3 | 4 | 5 | 6 | 7 (lsb) | # of bytes | |
|---------|---|---|---|---|---|---|---------|------------|---|
| ef | extType = 12 | | | | | | | 1 | Octet M |
| extLen = 0x01 (1 word) | | | | | | | | 1 | M+1 |
| 1$^{st}$ port nullDimensionInd | | | | | | | | 1 | M+2 |
| 2$^{nd}$ port nullDimensionInd | | | | | | | | 1 | M+3 |
| 3$^{rd}$ port nullDimensionInd | | | | | | | | 1 | M+4 |
| 4$^{th}$ port nullDimensionInd | | | | | | | | 1 | M+5 |

FIG.8

DEVICE AND METHOD FOR FRONTHAUL TRANSMISSION IN WIRELESS COMMUNICATION SYSTEM

CROSS-REFERENCE TO RELATED APPLICATION(S)

This application is a continuation application, claiming priority under § 365(c), of an International application No. PCT/KR2021/012893, filed on Sep. 17, 2021, which is based on and claims the benefit of a Korean patent application number 10-2020-0120141, filed on Sep. 17, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus and method for fronthaul transmission in a wireless communication system.

2. Description of Related Art

To meet a demand on wireless data traffic which has been in an increasing trend after a $4^{th}$ Generation (4G) communication system was commercialized, there is an ongoing effort to develop an improved $5^{th}$ Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in a millimeter wave (mmWave) band (e.g., such as a 60 gigahertz (GHz) band). To reduce a propagation path loss at the mmWave band and to increase a propagation delivery distance, beamforming, massive Multiple Input Multiple Output (MIMO), Full Dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

With the increase in transmission capacity in the wireless communication system, a function split for functionally splitting a base station is applied. According to the function split, the base station may be split into a Digital Unit (DU) and a Radio Unit (RU). A fronthaul for communication between the DU and the RU is defined, and transmission through the fronthaul is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for configuring a control message transmitted on a fronthaul interface.

Another aspect of the disclosure is to provide a method and apparatus for improving reception performance of a terminal located at a cell boundary, when a Digital Unit (DU) and a Radio Unit (RU) operate in a wireless communication system.

Additional aspects will be set forth in part in the description which follows and, in part, will be apparent from the description, or may be learned by practice of the presented embodiments.

In accordance with an aspect of the disclosure, a method performed by a Digital Unit (DU) of a base station in a wireless communication system is provided. The method includes configuring, in a first control message, a section extension field including additional information, and transmitting the first control message to a Radio Unit (RU) of the base station. The first control message includes information on one or more terminals scheduled to the base station.

In accordance with another aspect of the disclosure, a method performed by an RU of a base station in a wireless communication system is provided. The method includes receiving a first control message in which a section extension field is configured from a DU of the base station, receiving a second control message including channel information on terminals in a coverage of the base station from the DU, calculating a Beamforming Weight (BFW), based on the first control message and the second control message, and transmitting a downlink signal, based on the BFW.

A method and apparatus according to various embodiments of the disclosure enable an operation of Cooperative Beamforming (CB) based on a Cooperative Multi-Point (CoMP), by inserting a parameter indicating whether it is a nulling layer to a control message transmitted on a fronthaul.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates a frame format of an extended section of a control message according to various embodiments of the disclosure;

FIG. 8 illustrates a frame format of an extended section of a control message according to various embodiments of the disclosure;

Throughout the drawings, it should be noted that like reference numbers are used to depict the same or similar elements, features, and structures.

DETAILED DESCRIPTION

Figure 1A:
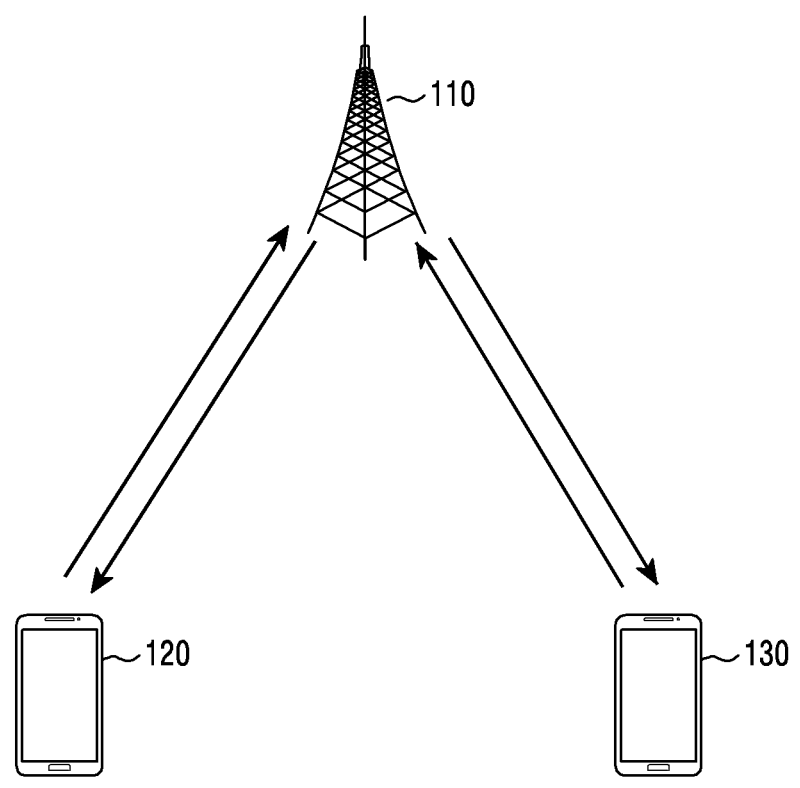
FIG. 1A illustrates a wireless communication system according to various embodiments of the disclosure.

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Hereinafter, terms used to refer to a signal (e.g., a message, information, a preamble, a signal, signaling, a sequence, a stream), terms used to refer to a resource (e.g., a symbol, a slot, a subframe, a radio frame, a subcarrier, a Resource Element (RE), a Resource Block (RB), a Bandwidth Part (BWP), an occasion), terms used to refer to an operational state (e.g., a step, an operation, a procedure), terms used to refer to data (e.g., a packet, a user stream, information, a bit, a symbol, codeword), terms used to refer to a channel, terms used to refer to control information (e.g., Downlink Control Information (DCI), Medium Access Control (MAC) Control Element (CE), Radio Resource Control (RRC) signaling), terms used to refer to network entities, terms used to refer to a constitutional element of a device, or the like are exemplified for convenience of explanation.

Therefore, the disclosure is not limited to terms described below, and thus other terms having the same technical meaning may also be used.

In addition, although an expression 'greater than' or 'less than' is used in the disclosure to determine whether a specific condition is satisfied (or fulfilled), this is for purposes only and does not exclude an expression of 'greater than or equal to' or 'less than or equal to'. A condition described as 'greater than or equal to' may be replaced with 'greater than' A condition described as 'less than or equal to' may be replaced with 'less than' A condition described as 'greater than or equal to and less than' may be replaced with 'greater than and less than or equal to'.

In addition, although the disclosure describes various embodiments by using terms used in some communication standards (e.g., $3^{rd}$ Generation Partnership Project (3GPP), extensible Radio Access Network (xRAN), Open-Radio Access Network (O-RAN)), embodiments of the disclosure are not limited thereto. Various embodiments of the disclosure may be easily modified and applied to other communication systems.

FIG. 1A illustrates a wireless communication system according to various embodiments of the disclosure.

Referring to FIG. 1A, as part of nodes which use a radio channel, a base station 110, a terminal 120, and a terminal 130 are exemplified in the illustrated wireless communication system. Although only one base station is illustrated in FIG. 1A, other base stations identical or similar to the base station 110 may be further included.

Referring to FIG. 1A, the base station 110 is a network infrastructure which provides a radio access to the terminals 120 and 130. The base station 110 has a coverage defined as a specific geographic region, based on a distance capable of transmitting a signal. In addition to the term 'base station', the base station 110 may be referred to as an 'Access Point (AP)', an 'eNodeB (eNB)', a '$5^{th}$ Generation (5G) node', a 'next generation NodeB (gNB)', a 'wireless point', a 'Transmission/Reception Point (TRP)', or other terms having equivalent technical meanings.

Each of the terminal 120 and the terminal 130 communicates with the base station 110 through the radio channel. A link from the base station 110 to the terminal 120 or the terminal 130 is referred to as a Downlink (DL), and a link from the terminal 120 or the terminal 130 to the base station 110 is referred to as an Uplink (UL). In addition, the terminal 120 and the terminal 130 may communicate with each other through the radio channel. In this case, a link between the terminal 120 and the terminal 130, i.e., a Device-to-Device (D2D) link, is referred to as a sidelink, and may be used interchangeably with a PC5 interface. Optionally, at least one of the terminals 120 to 130 may be operated without user involvement. That is, as a device for performing Machine Type Communication (MTC), at least one of the terminals 120 to 130 may not be carried by the user. In addition to the term 'terminal', each of the terminals 120 and 130 may be referred to as a 'User Equipment (UE)', a 'Customer Premises Equipment (CPE)', a 'mobile station', a 'subscriber station', a 'remote terminal', a 'wireless terminal', an 'electronic device', a 'user device', or other terms having equivalent technical meanings.

The base station 110, the terminal 120, and the terminal 130 may perform beamforming. The base station and the terminal may transmit and receive a radio signal at a relatively low frequency band (e.g., a Frequency Range 1 (FR1) of NR). In addition, the base station and the terminal may transmit and receive a radio signal at a relatively high frequency band (e.g., FR2 of NR, a millimeter Wave (mm- Wave) band (e.g., 28 GHz, 30 GHz, 38 GHz, 60 GHz)). In some embodiments, the base station 110 may communicate with the terminal 120 within a frequency range corresponding to the FR1. In some embodiments, the base station may communicate with the terminal 120 within a frequency range corresponding to the FR2. In this case, to improve a channel gain, the base station 110, the terminal 120, and the terminal 130 may perform beamforming. Herein, the beamforming may include transmission beamforming and reception beamforming. The base station 110, the terminal 120, and the terminal 130 may assign a directivity to a transmission signal and or a reception signal. For this, the base station 110 and the terminals 120 and 130 may select serving beams through a beam search or beam management procedure. After the serving beams are selected, subsequent communication may be performed through a resource having a Quasi Co-Located (QCL) relation with a resource used to transmit the serving beams.

If large-scale characteristics of a channel which has delivered a symbol on a first antenna port may be inferred from a channel which has delivered a symbol on a second antenna port, it may be evaluated that the first antenna port and the second antenna port have the QCL relation. For example, the large-scale characteristics may include at least one of a delay spread, a Doppler spread, a Doppler shift, an average gain, an average delay, and a spatial receiver parameter.

Although FIG. 1A illustrates that both the base station and the terminal perform the beamforming, various embodiments of the disclosure are not necessarily limited thereto. In some embodiments, the terminal may perform, or may not perform, the beamforming. In addition, the base station may perform, or may not perform, the beamforming. Any one of the base station and the terminal may perform the beamforming, or both the base station and the terminal may not perform the beamforming.

In the disclosure, a beam means a spatial flow of a signal in a radio channel, and is formed by one or more antennas (or antenna elements). Such a forming process may be referred to as beamforming. The beamforming may include analog beamforming and digital beamforming (e.g., precoding). Examples of a reference signal transmitted based on the beamforming may include a Demodulation-Reference Signal (DM-RS), a Channel State Information-Reference Signal (CSI-RS), a Synchronization Signal/Physical Broadcast Channel (SS/PBCH), and a Sounding Reference Signal (SRS). In addition, as a configuration for each reference signal, an IE such as a CSI-RS resource or an SRS-resource or the like may be used, and this configuration may include information associated with the beam. The information associated with the beam may mean whether a corresponding configuration (e.g., CSI-RS resource) uses the same spatial domain filter of another configuration (e.g., another CSI-RS resource in the same CSI-RS resource set) or uses another spatial domain filter, or to which reference signal it is subjected to Quasi-Co-Located (QCL), and if it is subjected to the QCL, which type (e.g., QCL type A, B, C, D) it is.

According to the related art, in a communication system having a relatively large cell radius of a base station, each base station is installed to include functions of a digital processing unit (or a Digital Unit (DU)) and a Radio Frequency (RF) processing unit (or a Radio Unit (RU)). However, since a higher frequency band is used and a cell radius of a base station is decreased in a 4$^{th}$ Generation (4G) and/or next-generation communication system, the number of base stations for covering a specific region is increased, and an installation cost burden of an operator is increased to install the increased number of base stations. In order to minimize the installation cost of the base station, a structure is proposed in which the DU and the RU of the base station are separated such that one or more RUs are coupled to one DU through a wired network, and one or more RUs geographically distributed to cover the specific region are disposed. Hereinafter, a structure of disposing the base station and extended examples thereof will be described according to various embodiments of the disclosure with reference to FIG. 1B.

Figure 1B:
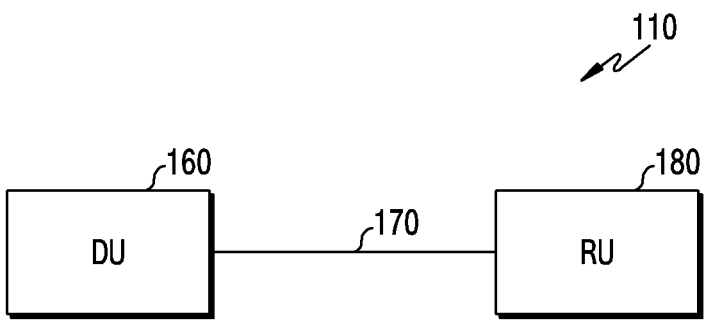
FIG. 1B illustrates an example of a fronthaul structure based on a functional split of a base station according to various embodiments of the disclosure.

FIG. 1B illustrates an example of a fronthaul structure based on a functional split of a base station according to various embodiments of the disclosure. A fronthaul refers to a connection from one entity to another, between a WLAN and the base station, unlike a backhaul between the base station and a core network.

Referring to FIG. 1B, the base station 110 may include the DU 160 and the RU 180. A fronthaul 170 between the DU 160 and the RU 180 may be operated through an F$_x$ interface. For the operation of the fronthaul 170, for example, an interface such as enhanced Common Public Radio Interface (eCPRI) or Radio Over Ethernet (ROE) may be used.

With the development of communication technology, mobile data traffic increases, which results in a significant increase in a bandwidth required in a fronthaul between a DU and an RU. In a deployment such as a Centralized/Cloud Radio Access Network (C-RAN), the DU may be realized to perform functions for Packet Data Convergence Protocol (PDCP), Radio Link Control (RLC), Media Access Control (MAC), and Physical (PHY), and the RU may be realized to further perform functions for the PHY layer in addition to a Radio Frequency (RF) function.

The DU 160 may be in charge of an upper layer function of a wireless network. For example, the DU 160 may perform a function of the MAC layer and a part of the PHY layer. Herein, the part of the PHY layer is performed at a higher level among functions of the PHY layer, and may include, for example, channel encoding (or channel decoding), scrambling (or descrambling), modulation (or demodulation), layer mapping (or layer demapping). According to an embodiment of the disclosure, when the DU 160 conforms to the O-RAN standard, the DU may be referred to as an O-RAN DU (O-DU). Optionally, the DU 160 may be represented by being replaced with a first network entity for a base station (e.g., gNB) in embodiments of the disclosure.

The RU 180 may be in charge of a lower layer function of the wireless network. For example, the RU 180 may perform a part of the PHY layer and an RF function. Herein, the part of the PHY layer is performed at a relatively lower level than the DU 160 among the functions of the PHY layer, and may include, for example, inverse fast Fourier transform (IFFT) conversion (or FFT conversion), communication processor (CP) insertion (CP removal), and digital beamforming. An example of such a function split is described in detail with reference to FIG. 4. The RU 180 may be referred to as an 'Access Unit (AU)', an 'Access Point (AP)', a 'Transmission/Reception Point (TRP)', a Remote Radio Head (RRH), a 'Radio Unit (RU)', or other terms having equivalent technical meanings. Optionally, the DU 160 may be represented by being replaced with a second network entity for a base station (e.g., gNB) in embodiments of the disclosure.

Although FIG. 1B illustrates that the base station includes the DU and the RU, various embodiments of the disclosure are not limited thereto. In some embodiments, the base station may be realized with a distributed deployment according to a Centralized Unit (CU) configured to perform a function of upper layers (e.g., Packet Data Convergence Protocol (PDCP), RRC) of an access network and a Distributed Unit (DU) configured to perform a function of a lower layer. In this case, the Distributed Unit (DU) may include the Digital Unit (DU) and Radio Unit (RU) of FIG. 1B. Between a core (e.g., 5G Core (5GC) or Next Generation Core (NGC)) network and a wireless network (RAN), the base station may be realized in a structure in which a CU, a DU, and an RU are deployed in that order. An interface between the CU and the Distributed Unit (DU) may be referred to as an F1 interface.

The CU may be coupled to one or more DUs to be in charge of a function of an upper layer than the DU. For example, the CU may be in charge of a function of a Radio Resource Control (RRC) and Packet Data Convergence Protocol (PDCP) layer, and the DU and the RU may be in charge of a function of a lower layer. The DU may perform some functions (high PHY) of Radio Link Control (RLC), Media Access Control (MAC), Physical (PHY) layers. In addition, for example, the Digital Unit (DU) may be included in a Distributed Unit (DU) according to a distributed deployment realization of the base station. Hereinafter, although operations of the DU and RU are described unless otherwise defined, various embodiments of the disclosure may be applied to both a case where a base station including the CU is disposed and a case where the DU is coupled directly to a core network without the CU (i.e., the CU and the DU are implemented by being integrated as one entity).

Figure 2:
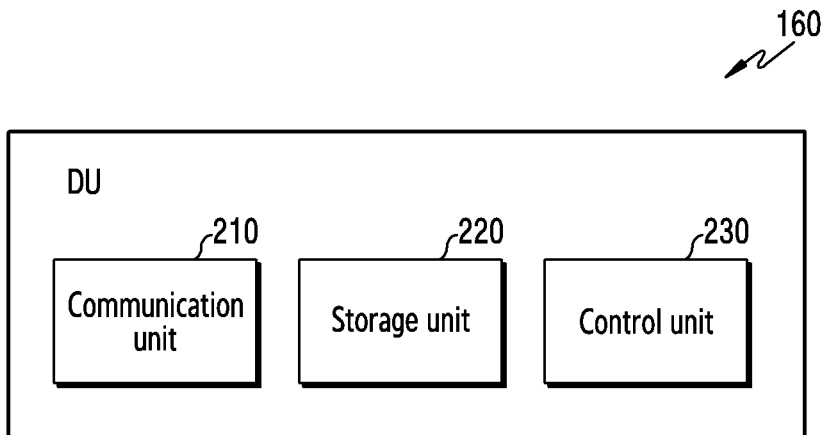
FIG. 2 illustrates a structure of a Digital Unit (DU) in a wireless communication system according to various embodiments of the disclosure.

FIG. 2 illustrates a structure of a Digital Unit (DU) in a wireless communication system according to various embodiments of the disclosure. The structure of FIG. 2 may be understood as a structure of the DU 160 of FIG. 1B. Hereinafter, the term ' . . . unit', ' . . . device', or the like implies a unit of processing at least one function or operation, and may be implemented in hardware or software or in combination of the hardware and the software.

Referring to FIG. 2, the DU 160 may include a communication unit 210, a storage unit 220, and a control unit 230.

The communication unit 210 may perform functions for transmitting/receiving a signal in a wired communication environment. The communication unit 210 may include a wired interface for controlling a direct connection between one device and another device via a transmission medium (e.g., a copper wire, an optical fiber). For example, the communication unit 210 may transfer an electrical signal to another device via the copper line, or may perform a conversion between the electrical signal and an optical signal. The communication unit 210 may be coupled to a Radio Unit (RU). The communication unit 210 may be coupled to a core network or may be coupled to a Central Unit (CU) or Distributed Unit (DU) deployed in a distributed manner.

The communication unit 210 may perform functions for transmitting/receiving a signal in a wireless communication environment. For example, the communication unit 210 may perform a function of conversion between a baseband signal and a bit-stream according to a physical layer standard of a system. For example, in data transmission, the communication unit 210 may generate complex symbols by coding and modulating a transmitted bit-stream. In addition, in data reception, the communication unit 210 may restore a received bit-stream through demodulation and decoding of a baseband signal. In addition, the communication unit 210 may include a plurality of transmission/reception paths. In addition, according to an embodiment, the communication unit 210 may be coupled to a core network or may be coupled to other nodes (e.g., Integrated Access Backhaul (IAB)).

The communication unit 210 may transmit and receive a signal. For this, the communication unit 210 may include at least one transceiver. For example, the communication unit 210 may transmit a synchronization signal, a reference signal, system information, a message, a control message, a stream, control information, data, or the like. In addition, the communication unit 210 may perform beamforming.

The communication unit 210 may transmit and receive a signal as described above. Accordingly, the communication unit 210 may be referred to as a 'transmitter', a 'receiver', or a 'transceiver'. In addition, in the following description, transmission and reception performed through a radio channel may be used to imply that the aforementioned process is performed by the communication unit 210.

Although not shown in FIG. 2, the communication unit 210 may further include a backhaul communication unit to be coupled to the core network or a different base station. The backhaul communication unit may provide an interface for performing communication with different nodes in a network. That is, the backhaul communication unit may convert a bit-stream transmitted from the base station to a different node, for example, a different access node, a different base station, a higher node, a core network, or the like, into a physical signal, and converts the physical signal received from the different node into a bit-stream.

The storage unit 220 may store data such as a basic program, application program, configuration information, or the like for an operation of the DU 160. The storage unit 220 may include a memory. The storage unit 220 may be constructed of a volatile memory, a non-volatile memory, or a combination of the volatile memory and the non-volatile memory. In addition, the storage unit 220 may provide stored data according to a request of the control unit 230.

The control unit 230 may control overall operations of the DU 160. For example, the control unit 230 may transmit and receive a signal via the communication unit 210 (or through the backhaul communication unit). Further, the control unit 230 may write data to the storage unit 220 and read the data. In addition, the communication unit 230 may perform functions of a protocol stack required in a communication standard. For this, the control unit 230 may include at least one processor. The control unit 230 may configure a section extension field including a parameter indicating whether a layer is nulled with respect to a control message (e.g., a section type 5). The control unit 230 may control the DU 160 to perform operations according to various embodiments described below.

The structure of the DU 160 of FIG. 2 is only an example, and the example of the DU performing various embodiments of the disclosure is not limited to the structure illustrated in FIG. 2. The structure may be added, deleted, or changed in part according to various embodiments.

Figure 3:
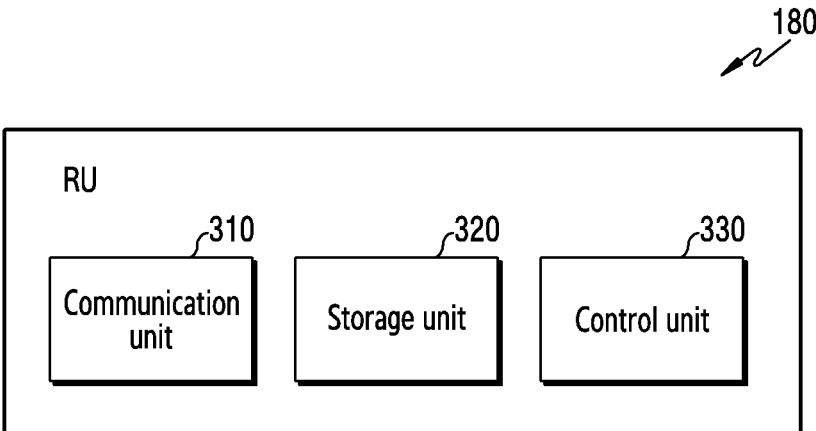
FIG. 3 illustrates a structure of a Radio Unit (RU) in a wireless communication system according to various embodiments of the disclosure.

FIG. 3 illustrates a structure of a Radio Unit (RU) in a wireless communication system according to various embodiments of the disclosure. The structure of FIG. 3 may be understood as a structure of the RU 180 of FIG. 1B. Hereinafter, the term ' . . . unit', ' . . . device', or the like implies a unit of processing at least one function or operation, and may be implemented in hardware or software or in combination of the hardware and the software.

Referring to FIG. 3, the RU 180 includes a communication unit 310, a storage unit 320, and a control unit 330.

The communication unit 310 may perform functions for transmitting and receiving a signal through a radio channel.

For example, the communication unit 310 may up-convert a baseband signal into an RF signal and thereafter transmit it through an antenna, and may down-convert an RF signal received through the antenna into a baseband signal. For example, the communication unit 310 may include a trans-mission filter, a reception filter, an amplifier, a mixer, an oscillator, a Digital-to-Analog Converter (DAC), an Analog-to-Digital Converter (ADC), or the like.

In addition, the communication unit 310 may include a plurality of transmission/reception paths. Further, the com-munication unit 310 may include an antenna unit. The communication unit 310 may include at least one antenna array constructed of a plurality of antenna elements. From a hardware aspect, the communication unit 310 may be con-structed of a digital circuit and an analog circuit (e.g., a Radio Frequency Integrated Circuit (RFIC)). According to an embodiment of the disclosure, the digital circuit and the analog circuit may be realized as one package. In addition, the communication unit 310 may include a plurality of RF chains. The communication unit 310 may perform beam-forming. In order to assign a directivity depending on a configuration of the control unit 330 to a signal to be transmitted/received, the communication unit 310 may apply a beamforming weight to the signal. According to an embodiment, the communication unit 310 may include a Radio Frequency (RF) block (or an RF unit).

In addition, the communication unit 310 may transmit and receive a signal. For this, the communication unit 310 may include at least one transceiver. The communication unit 310 may transmit a downlink signal. The downlink signal may include a Synchronization Signal (SS), a Reference Signal (RS) (e.g., Cell-specific Reference Signal (CRS), Demodu-lation (DM)-RS), system information (e.g., MIB, SIB, Remaining System Information (RMSI), Other System Information (OSI)), configuration message, control informa-tion, uplink data, or the like. In addition, the communication unit 310 may receive an uplink signal. The uplink signal may include a random access-related signal (e.g., Random Access Preamble (RAP) (or Message 1 (Msag1), Message 3 (Msg3)), a reference signal (e.g., Sounding Reference Signal (SRS), DM-RS), a Power Headroom Report (PHR), or the like.

The communication unit 310 may transmit and receive a signal as described above. Accordingly, the communication unit 310 may be referred to as a 'transmitter', a 'receiver', or a 'transceiver'. In addition, in the following description, transmission and reception performed through a radio chan-nel are used to imply that the aforementioned process is performed by the communication unit 310.

The storage unit 320 stores data such as a basic program, application program, configuration information, or the like for an operation of the RU 180. The storage unit 320 may be constructed of a volatile memory, a non-volatile memory, or a combination of the volatile memory and the non-volatile memory. In addition, the storage unit 320 may provide stored data according to a request of the control unit 330.

The control unit 330 may control overall operations of the RU 180. For example, the control unit 330 may transmit and receive a signal via the communication unit 310. Further, the control unit 330 may write data to the storage unit 320 and read the data. In addition, the communication unit 330 may perform functions of a protocol stack required in a commu-nication standard. For this, the control unit 330 may include at least one processor.

The control unit 330 may calculate a Beamforming Weight (BFW) in a Zero-Forcing (ZF) manner, based on a control message (e.g., a section type 5) to be applied to a downlink signal and received from the DU 160. The control unit 330 may control the RU 180 to perform operations according to various embodiments described below.

The structure of the RU 180 illustrated in FIG. 3 is only an example, and the example of the RU performing various embodiments of the disclosure is not limited to the structure illustrated in FIG. 3. The structure may be added, deleted, or changed in part according to various embodiments of the disclosure.

Figure 4:
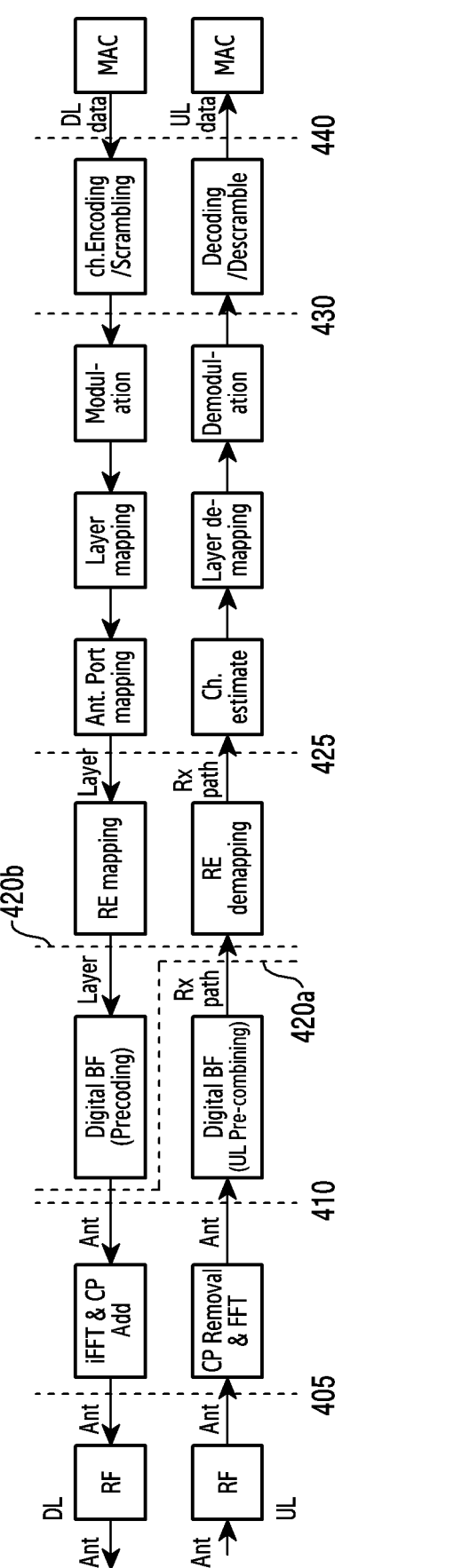
FIG. 4 illustrates an example of a function split in a wireless communication system according to various embodiments of the disclosure.

FIG. 4 illustrates an example of a function split in a wireless communication system according to various embodiments of the disclosure.

Referring to FIG. 4, with the development of wireless communication technology (e.g., with the instruction of a 5$^{th}$ Generation (5G) communication system (or New Radio (NR) communication system)), a frequency band to be used further increases, and a cell radius of a base station becomes very small, which results in a further increase in the number of RUs required to be installed. In addition, in the 5G communication system, an amount of data to be transmitted increases up to more than 10 times, which results in a significant increase in transmission capacity of a wired network in which fronthaul transmission is achieved. Due to these factors, installation cost of the wired network may significantly increase in the 5G communication system. Therefore, in order to decrease the transmission capacity of the wired network and to reduce the installation cost of the wired network, technologies for reducing the transmission capacity of the fronthaul by allowing the RU to be in charge of some functions of the modem of the DU have been proposed, and these technologies may be referred to a 'function split'.

In order to reduce the burden of the DU, a method in which the role of the RU responsible for only the RF function is extended to some functions of the physical layer is considered. In this case, the higher the layer of which functions are performed by the RU, the greater the through-put of the RU, which results in an increase in a transmission bandwidth in the fronthaul. At the same time, a requirement constraint for a delay time caused by response processing may be decreased. Meanwhile, the higher the layer of which functions are performed by the RU, the lower the virtual-ization gain and the higher the size/weight/cost of the RU. It is required to realize an optimal function split by consid-ering a trade-off of the aforementioned advantages and disadvantages.

Referring to FIG. 4, function splits in a physical layer below an MAC layer is illustrated. In a Downlink (DL) case in which a signal is transmitted to a terminal through a wired network, a base station may sequentially perform channel encoding/scrambling, modulation, layer mapping, antenna mapping, RE mapping, digital beamforming (e.g., precod-ing), IFFT conversion/CP insertion, and RF conversion. In case of an Uplink (UL) in which a signal is received from the terminal through the wired network, the base station may sequentially perform RF conversion, FFT conversion/CP removal, digital beamforming (pre-combining), RE demap-ping, channel estimation, layer demapping, demodulation, and decoding/descrambling. The split for uplink functions and downlink functions may be defined in various types depending on necessity between vendors, discussion on standards, or the like according to the aforementioned trade-off.

A first function split 405 may be a split of the RF function and the PHY function. The first function split is when the PHY function in the RU is not realized in practice, and may be referred to as Option 8. A second function split 410 allows the RU to perform IFFT transform/CP insertion in DL of the PHY function and FFT transform/CP removal in UL, and allows the DU to perform the remaining PHY functions. The second function split 410 may be referred to as Option 7-1. A third function split 420*a* may allow the RU to perform IFFT conversion/CP insertion in DL and FFT conversion/CP removal in UL and beamforming, and allows the DU to perform the remaining PHY functions. The third function split 420*a* may be referred to as Option 7-2x Category A. A fourth function split 420*b* allows the RU to perform up to digital beamforming in both DL and UL, and allows the DU to perform higher PHY functions after digital beamforming. The fourth function split 420*b* may be referred to as Option 7-2x Category B. A fifth function split 425 allows the RU to perform up to RE mapping (or RE demapping) in both DL and UL, and allow the DU to perform higher PHY functions after RE mapping (or RE demapping). The fifth function split 425 may be referred to as Option 7-2. A sixth function split 430 allows the RU to perform up to modulation (or demodulation) in both DL and UL, and allows the DU to perform higher PHY functions after modulation (or demodulation). The sixth function split 430 may be referred to as Option 7-3. A seventh function split 440 allows the RU to perform up to encoding/scrambling (or decoding/descrambling) in both DL and UL, and allows the DU to perform higher PHY functions after modulation (or demodulation). The seventh function split may be referred to as Option 6.

When large-capacity signal processing is expected as in FR1 MMU, a function split at a relatively upper layer (e.g., the fourth function split 420*b*) may be required to reduce fronthaul capacity. In addition, a function split at an extremely high layer (e.g., the sixth function split 430) may have a complicated control interface and may cause a burden on the realization of the RU because a plurality of PHY processing blocks are included in the RU. Therefore, an appropriate function split may be required according to a method of deploying and realizing the DU and the RU.

When it is not possible to process precoding of data received from the DU (i.e., when there is a limitation in precoding capability of the RU), the third function split 420*a* or a function split lower than that (e.g., the second function split 410) may be applied. However, when there is an ability to process the precoding of the data received from the DU, the fourth function split 420*b* or a function split higher than that (e.g., the sixth function split 430) may be applied. Hereinafter, various embodiments of the disclosure are described based on the third function split 420*a* (category A) or fourth function split 420*b* (category B) for performing a beamforming process in one RU unless otherwise limited, but this does not mean that a configuration of an embodiment of the disclosure through other function split is excluded. A functional configuration, signaling, or operation of FIGS. 5 to 9 described below may be applied not only to the third function split 420*a* or the fourth function split 420*b* but also other function splits.

According to various embodiments of the disclosure, standards of eCPRI and O-RAN are described for example as a fronthaul interface, when a message is transmitted between a DU (e.g., the DU 160 of FIG. 1B) and an RU (e.g., the RU 180 of FIG. 1B). An eCPRI header and an O-RAN header, and an additional field may be included in an Ethernet payload of a message. Although various embodiments of the disclosure are described hereinafter by using terms of the standard of eCPRI or O-RAN, other expressions having the same meaning as the respective terms may be used instead of various embodiments of the disclosure.

A transport protocol of the fronthaul may use Ethernet and eCPRI which are easily shared with a network. An eCPRI header and an O-RAN header may be included in an Ethernet payload. The eCPRI header may be located in front of the Ethernet payload. The content of the eCPRI header is as follows.

ecpriVersion (4 bits): 0001b (fixed value).
ecpriReserved (3 bits): 0000b (fixed value).
ecpriConcatenation (1 bit): 0b (fixed value).
ecpriMessage (1 byte): Message type.
ecpriPayload (2 bytes): Payload size in bytes.
ecpriRtcid/ecpriPcid (2 bytes): x, y, and z may be configured through a Management plane (M-plane). This field may indicate a transmission path (an extended Antenna-carrier (eAxC) in eCPRI) of a control message according to various embodiments in multi-layer transmission.
CU_Port_ID (x bits): Identify a channel card. Identification is possible by including even a modem (2 bits for channel card, 2 bits for Modem).
BandSector_ID (y bits): Identification based on cell/sector.
CC_ID (z bits): Identification based on component carrier.
RU_Port_ID (w bits): Identification based on layer, T, antenna, etc.
ecpriSeqid (2 bytes): Sequence ID is managed for each ecpriRtcid/ecpriPcid, and Sequence ID and subsequence ID are managed separately. Radio-transport-level fragmentation is possible when using Subsequence ID (different from Application-level fragmentation).

An application protocol of the fronthaul may include a Control plane (C-plane), a User plane (U-plane), a Synchronization plane (S-plane), and a Management plane (M-plane).

The C-plane may be configured to provide scheduling information and beamforming information through the control message. The U-plane may include user's downlink data (IQ data or SSB/RS), uplink data (IQ data or SRS/RS), or PRACH data. A weight vector of the aforementioned beamforming information may be multiplied by the user's data. The S-plane may be related to timing and synchronization. The M-plane may be related to an initial setup, non-realtime reset or a reset, and a non-realtime report.

A section type is defined to define a type of a message transmitted in the C-plane. The section type may indicate a usage of the control message transmitted in the C-plane. For example, a usage for each section type is as follows.

sectionType=0: DL idle/guard periods—Tx blanking usage for power saving.
sectionType=1: Mapping of BF index or weight to RE of DL/UL channel (in O-RAN mandatory BF manner).
sectionType=2: Reserved.
sectionType=3: Mapping of beamforming index or weight to RE of PRACH and mixed-numerology channel.
sectionType=4: Reserved.
sectionType=5: Transfer of UE scheduling information (in O-RAN optional BF manner) so that RU is capable of calculating BF weight on real-time basis.
sectionType=6: Transfer of UE channel information (in O-RAN optional BF manner) periodically so that RU is capable of calculating BF weight on real-time basis.
sectionType=7: Used to support LAA.

Figure 5:
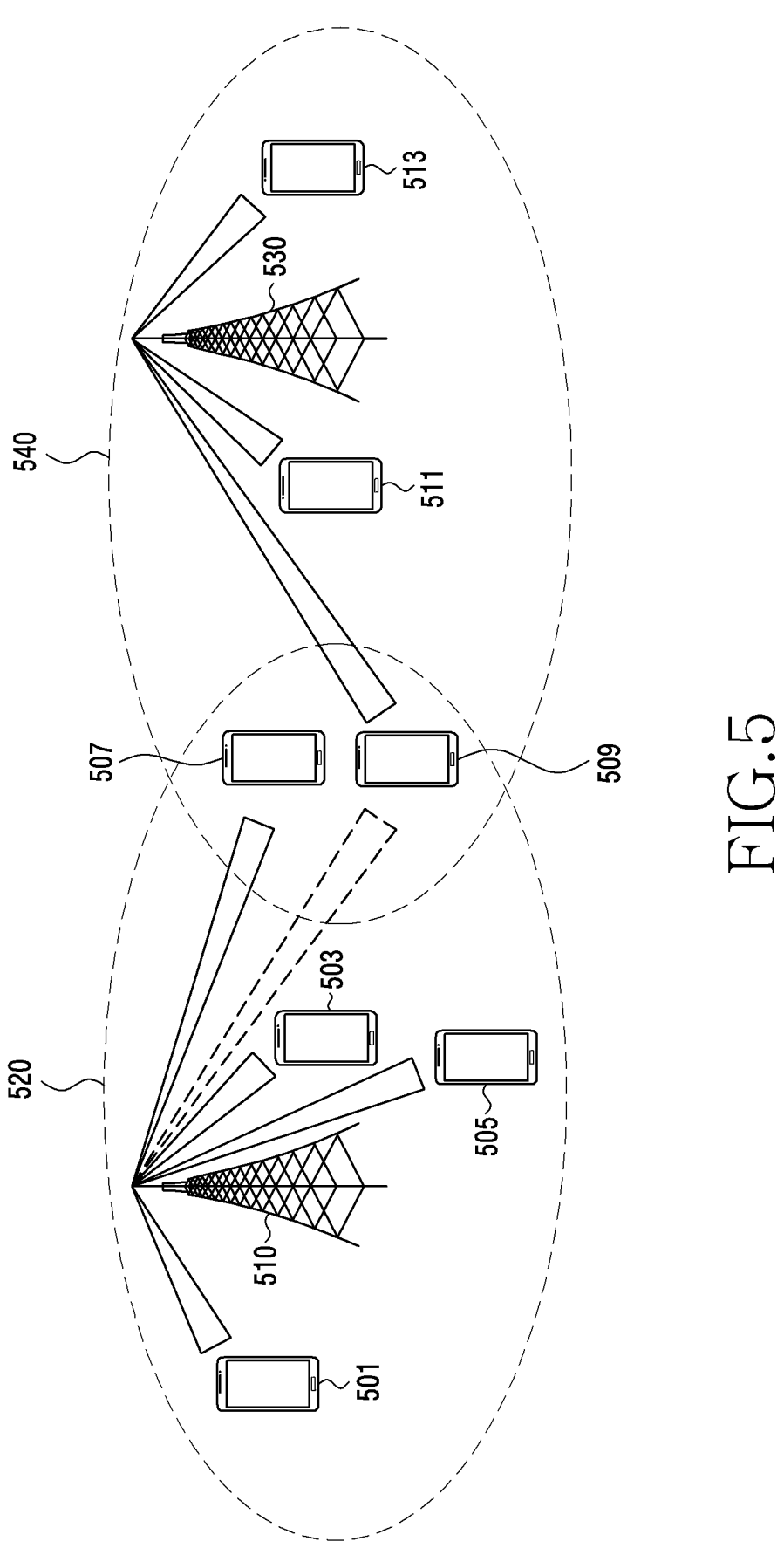
FIG. 5 illustrates an example of cooperative communication between base stations according to various embodiments of the disclosure.

FIG. 5 illustrates an example of cooperative communication between base stations according to various embodiments of the disclosure.

Referring to FIG. 5, it is assumed that terminals 501, 503, 505, and 507 are scheduled to a base station 510, the terminals 509, 511, and 513 are scheduled to a base station 530, and reference numerals 520 and 540 indicate coverages of the base stations 510 and 530, respectively.

In a wireless communication system, in order to solve Inter-Cell Interference (ICI) which may occur in an environment where a plurality of cells are densely present, cooperative transmission may be employed between multi-cells. The cooperative transmission may be referred to as Cooperative Multi-Point (CoMP) transmission. A CoMP transmission technique is a technique in which two or more transmission cells cooperatively communicate with terminals located at a cell boundary to reduce the ICI and increase a throughput. The CoMP transmission technique may improve reception performance of the terminal, based on sharing of scheduling information between base stations, by avoiding base stations from being scheduled with the same time/frequency resource (e.g., Cooperative Scheduling (CS)), by transmitting the same data together (e.g., Joint Transmission (JT)), or by allocating different spatial resources (beam patterns) to cell-boundary terminals (e.g., Cooperative Beamforming (CB)).

The CB, which is one of the CoMP transmission techniques, is a method in which neighboring base stations configure a beamforming weight for terminals located at a cell boundary such that interference is minimized, thereby improving reception performance for the terminals. Referring to FIG. 5, for the terminal 509 located at the cell boundary, each of the base stations 510 and 530 may estimate downlink channel information for the terminal 509 so that it is used in scheduling for downlink transmission. When the terminal 509 is scheduled to the base station 530, a downlink signal of the base station 510, which is transmitted by using the same time/frequency resource for a downlink signal transmitted by the base station 530 to the terminal 509, acts as ICI and thus may be a cause of reception performance deterioration of the terminal 509. Therefore, the base station 510 transmits the downlink signal to the terminals 501, 503, and 505 by using the same time/frequency resource as that of the base station 530, and applies a beamforming weight such that beam nulling is achieved in a direction for the terminal 509, thereby improving reception performance of the terminal 509.

Although the base station 510 and the base station 530 are described in FIG. 5, they are only nodes for describing a CoMP environment, and the terms do not limit implementations of the disclosure. According to an embodiment of the disclosure, the base station 510 may be constructed of an RU #1 and a DU, and the base station 530 may be constructed of an RU #2 and a DU. In other words, each cell is configured in a different RU, but is coupled to one DU. Thus, the DU may be configured to collect channel information in each RU. According to another embodiment of the disclosure, the base station 510 may be constructed of the RU #1 and a DU #1, and the base station 530 may be constructed of an RU #2 and a DU #2. The RU #1 and the DU #1 may be coupled through a fronthaul interface, and the RU #2 and the DU #2 may be coupled through the fronthaul interface. In this case, the DU #1 and the DU #2 may use a backhaul interface (e.g., X2, XN) to share channel information in each cell.

In the CoMP environment, when the base station 510 performs Multi-User (MU) beamforming, transmission of a beamformed signal to the terminal 509 scheduled to the neighboring base station 530 allows the terminal 509 to experience ICI. In particular, the ICI problem may become worse in a millimeter-wave environment due to an increase in the coverages 520 and 540 of the base station. Therefore, the base station 510 needs to null a beam in a direction of the terminal 509 located at the cell boundary.

The DU 160 may transmit scheduling information to the RU 180 through a control message (e.g., a section type 5). In this case, the scheduling information may be resource information indicating terminals scheduled to one or more layers included on a Resource Block (RB) to be transmitted by the RU 180. Therefore, the scheduling information indicates only the terminal allocated to the resource on the RB, and does not indicate whether a corresponding layer is nulled. When the RU 180 performs MU beamforming, based on only the scheduling information, reception performance of the terminal located at the cell boundary inevitably deteriorates due to ICI. Therefore, the DU 160 needs to indicate a nulling layer to the RU 180.

In order to indicate the nulling layer, channel information of terminals existing in a cell coverage, scheduling information, and information on the nulling layer may be required. The channel information may be required to obtain a beamforming weight, and the scheduling information and the information on the nulling layer may be required to indicate whether a specific layer on a specific RB is nulled. Therefore, in order to decrease an overhead, the scheduling information and the information on the nulling layer need to be transmitted together.

According to an embodiment of the disclosure, the DU 160 may transmit downlink channel information on the terminals existing in the cell coverage to the RU 180 through a first control message. The DU 160 may transmit information on the terminal scheduled to the resource on the RB and information indicating whether each layer is nulled to the RU 180 through a second control message. The RU 180 may generate a Multi-User (MU) channel matrix, based on the first control message. The RU 180 may obtain a beamforming weight, by nulling a specific layer, based on the generated MU channel matrix and the second control message. The RU 180 may transmit a downlink signal, by applying beamforming on transmission data, based on the generated beamforming weight.

In this case, since a signal is not transmitted in a direction of a nulled beam, the ICI problem may be minimized in the terminal located at the cell boundary. In addition, since the RU 180 performs transmission by allocating power to be allocated to a nulled layer to another layer, transmission performance of the RU 180 may also be improved. In addition, even if the terminal located at the cell boundary is not scheduled to the RU 180, since a beamforming weight is obtained by including channel information of the terminal, the terminal located at the cell boundary may be prevented from being affected as ICI by a beam transmitted to the scheduled terminal as ICI.

This technique may also be applied to an NR communication system. As a method of indicating a beam to be nulled between network entities, a Channel station information Resource Indicator (CRI) or an SS/PBCH Block Resource Indicator (SSBRI) may be used. Nulling may be achieved by not applying a beamforming weight (precoding) related to a corresponding resource indicator in a cell.

Figure 6:
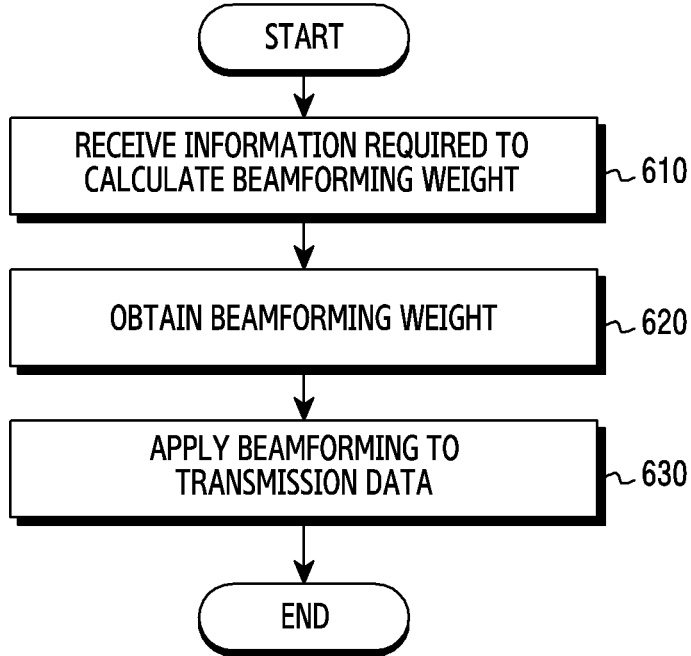
FIG. 6 illustrates an operational flow of an RU for beam nulling according to various embodiments of the disclosure.

FIG. 6 illustrates an operational flow of a Radio Unit (RU) for beam nulling according to various embodiments of the disclosure.

Referring to FIG. 6, in operation 610, the RU 180 may receive information required to calculate a beamforming weight from the Digital Unit (DU) 160. The RU 180 may receive the information required to calculate the beamforming weight from the DU 160 through a fronthaul.

The information required to calculate the beamforming weight may include a nulling dimension indicator. The nulling dimension indicator may indicate whether each layer on an RB is nulled. The RU 180 may periodically receive the nulling dimension indicator from the DU 160 through a section type 5. A period of receiving the nulling dimension indicator may be identical to a slot which is a time unit of scheduling.

The information required to calculate the beamforming weight may include scheduling information. The scheduling information may include resource information on terminals scheduled for respective layers on a Resource Block (RB). The RU 180 may periodically receive the scheduling information from the DU 160 through the section type 5. The period of receiving the scheduling information may be identical to the slot which is the time unit of scheduling. The RU 180 may receive the nulling dimension indicator and the scheduling information from the DU 160 through the section type 5. The RU 180 may decrease a fronthaul overhead, by transmitting the nulling dimension indicator and the scheduling information together.

The information required to calculate the beamforming weight may include channel information. The channel information may include downlink channel information for terminals included in a coverage of a base station. The channel information may include downlink channel information for terminals scheduled to the RU 180. The RU 180 may periodically receive the channel information from the DU 160 through a section type 6. According to an embodiment, a period of receiving the channel information may be longer than the slot which is the time unit of scheduling.

In operation 620, the RU 180 may obtain a beamforming weight. The RU 180 may obtain the beamforming weight, based on a Zero-Forcing (ZF) scheme. The RU 180 may generate a Multi-User (MU) channel matrix, based on the received channel information. For example, the MU channel matrix may be generated by overlapping the received channel information on each terminal with different layers. The RU 180 may generate an MU channel matrix by including both channel information on a terminal actually scheduled and channel information on a terminal to be nulled. The RU 180 may obtain an inverse matrix for the generated MU channel matrix. The RU 180 may obtain a nulling layer zero-masking, based on a nulling dimension indicator for the obtained inverse matrix. The nulling layer zero-masking may be a method of substituting a component corresponding to a layer of a terminal to be nulled among components of the obtained inverse matrix with a zero vector. The RU 180 may obtain a beamforming weight by performing a power normalization operation after performing the nulling layer zero-masking. The power normalization operation may be performed to allocate the same transmit power for each layer or to prevent transmit power for each antenna from exceeding a reference value. Although the ZF method is described in operation 620, this is only an example, and various embodiments of the disclosure may obtain a beamforming weight for nulling a beam for one or more terminals, based on the nulling dimension indicator.

In operation 630, the RU 180 may apply beamforming to transmission data. The RU 180 may apply the beamforming to the transmission data by multiplying the obtained beamforming weight by transmission data for each layer. Therefore, a downlink signal to which beamforming is applied will be transmitted such that Inter Cell Interference (ICI) is minimized in a direction of the nulled terminal.

Referring to the aforementioned procedure, the RU 180 may perform CB transmission by obtaining a beamforming weight, based on the nulling dimension indicator and channel information terminals in a coverage. In order to perform CB transmission, the RU 180 shall be capable of identifying a nulling layer. However, referring to an xRAN/ORAN standard, since a field indicating whether a layer is nulled is not defined in scheduling information transmitted by the DU 160 to the RU 180, it is not possible to support a CB transmission scheme. Eventually, in order to support the CB transmission scheme, information indicating whether each layer is nulled needs to be included in the scheduling information.

FIG. 7 illustrates a frame format of an extended section of a control message according to various embodiments of the disclosure. The frame format of the extended section indicating whether one layer is nulled is described in FIG. 7.

Referring to FIG. 7, the control message may be referred to as a section type 5, and the extended section of the control message may include an extension flag (ef), an extension type (extType), an extension length (exLen), and a null dimension indicator (nullDimensionInd).

The extension flag may indicate that a header is followed by section extension. According to an embodiment, the extension flag is 1-bit information, and may use 0 or 1 to indicate a presence of the section extension. That is, the extension flag indicates that the header is followed by a parameter additionally defined in the section type 5, and thus may provide extensibility for a parameter of the section type 5 without having to generate a new section type. A beam identifier (beamId) or user equipment identifier (ueId) field may be followed by the extension flag.

The extension type may indicate a type of the additionally provided parameter. The extension type may be constructed of 7-bit information. When the extension type is 12 (e.g., extType=12), the extension type may indicate that the additionally provided parameter is the parameter indicating whether a layer is nulled. Although it is illustrated in FIG. 7 that the extension type is 12 (extType=12), this is only an example, and may be defined as another number.

The extension length may indicate a length of the section extension. The extension length may be constructed of 8- to 16-bit information. When the extension length is 1 (e.g., extLen=0x01), a Radio Unit (RU) may identify that the additionally provided parameter is information indicating whether one layer is nulled.

The null dimension indicator may indicate whether a layer corresponding to a control message is nulled. The null dimension indicator may be constructed of 8-bit information. The RU may use the null dimension indicator to calculate a beamforming weight based on a Zero-Forcing (ZF) scheme. For example, when the null dimension indicator indicates that the layer corresponding to the control message is nulled, the RU may perform zero-masking for the layer in operation 630.

Referring to the aforementioned frame format, the nulling dimension indicator may be included in a control message including information on a terminal scheduled to a layer, so that the RU 180 which receives this is capable of identifying a nulling layer.

FIG. 8 illustrates a frame format of an extended section of a control message according to various embodiments of the disclosure. The frame format of the extended section indicating whether a plurality of layers are nulled is described in FIG. 8.

Referring to FIG. 8, the control message may be referred to as a section type 5, and the extended section of the control message may include an extension flag (ef), an extension type (extType), and an extension length (extLen). When utilized together with an extension type 10, the extended section of the control message may include one or more null indicators (e.g., a null dimension indicator (nullDimensionInd) of a Pt port, a null dimension indicator of a $2^{nd}$ port, a null dimension indicator of a $3^{rd}$ port, and a null dimension indicator of a $4^{th}$ port). That is, when utilized together with the extension type 10, since a plurality of null dimension indicator may be transmitted through one control message, an overhead in a control plane may be decreased.

The extension flag may indicate that a header is followed by section extension. The extension flag is 1-bit information, and may use 0 or 1 to indicate a presence of the section extension. A beam identifier (beamId) or user equipment identifier (ueId) field may be followed by the extension flag. That is, the extension flag indicates that the header is followed by a parameter additionally defined in the section type 5, and thus may provide extensibility for a parameter of the section type 5 without having to generate a new section type.

The extension type may indicate a type of the additionally provided parameter. The extension type may be constructed of 7-bit information. When the extension type is 12 (e.g., extType=12), the extension type may indicate that the additionally provided parameter is the parameter indicating whether a layer is nulled. Although it is illustrated in FIG. 8 that the extension type is 12 (extType=12), this is only an example, and may be defined as another number.

The extension length may indicate a length of the section extension. The extension length may be constructed of 8- to 16-bit information. When the extension length is 4 (e.g., extLen=0x04), a Radio Unit (RU) may identify that the additionally provided parameter is information indicating whether one layer is nulled.

A null dimension indicator of a first port may indicate whether a layer corresponding to an antenna port 1 is nulled. A null dimension indicator of a second port may indicate whether a layer corresponding to an antenna port 2 is nulled. A null dimension indicator of a third port may indicate whether a layer corresponding to an antenna port 3 is nulled. A null dimension indicator of a fourth port may indicate whether a layer corresponding to an antenna port 4 is nulled.

Although it is illustrated in FIG. 8 that a null indicator for four ports is included, this is only an example. An extended section may include four or more (e.g., 8, 16, 32, 64, etc.) null indicators.

Referring to the aforementioned frame format, a nulling dimension indicator is included in a control message including information regarding terminals scheduled for respective layers, so that the RU 180 receiving this is capable of identifying a nulling layer.

Figure 9:
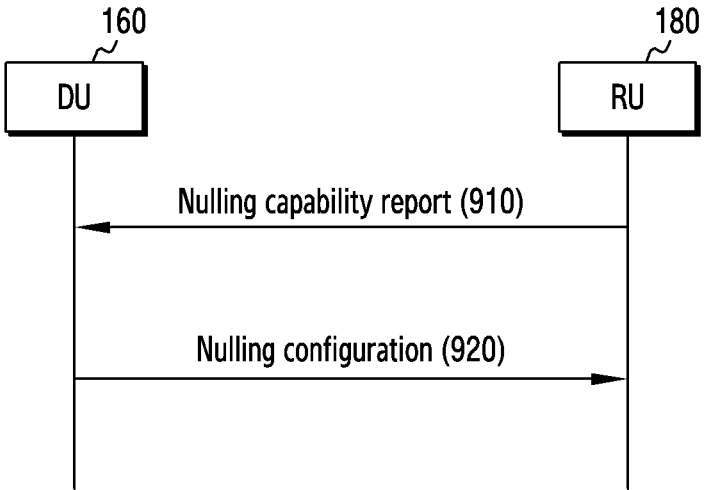
FIG. 9 illustrates a signal flow for configuring a nulling dimension function according to various embodiments of the disclosure.

FIG. 9 illustrates a signal flow for configuring a nulling dimension function according to various embodiments of the disclosure. Operations illustrated in FIG. 9 may be performed in a cell-setup process or a cell operation process.

Referring to FIG. 9, n operation 910, the DU 160 may receive a nulling capability report from the RU 180. The nulling capability report may include a parameter regarding whether the RU 170 supports a function of generating a beamforming weight by considering a nulling layer. For example, a management plane (mplane) parameter may be configured as shown in Table 1 below.

TABLE 1

```
Module: o-ran-uplane-conf
+--rw module-capability
  +--ro ru-capabilities
  |     +--ro format-of-iq-sample
  |     +--ro dynamic-compression-supported? boolean
  |     +--ro regularization-factor-se-supported? boolean
  |     +--ro little-endian-supported? boolean
  |     +--ro nulling-dimension-supported? Boolean
```

In operation 920, the DU 160 may transmit a nulling configuration to the RU 180. According to an embodiment, the nulling configuration may include a parameter for instructing activation or deactivation of a function in which the RU 180 generates a beamforming weight by considering a nulling layer. For example, a management plane parameter may be configured as shown in Table 2 below.

TABLE 2

```
Module: o-ran-uplane-conf
+--rw user-plane-configuration
  +--rw general-config
  |     +--rw regularization-factor-se-configured? boolean
  |     +--rw little-endian-byte-order? boolean
  |     +--rw nulling-dimension-configured? boolean
```

Figure 10:
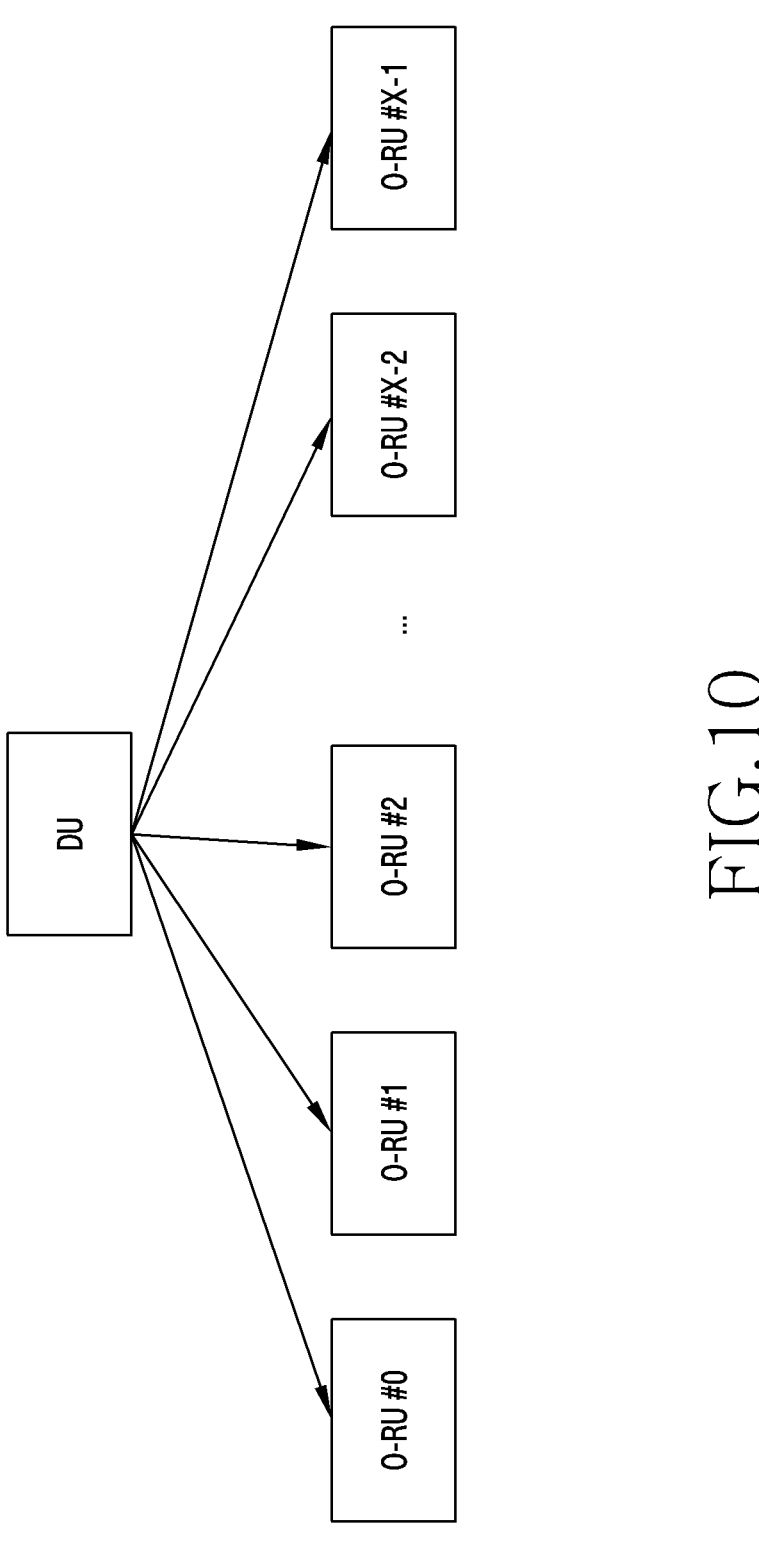
FIG. 10 illustrates an example of a connection between a Digital Unit (DU) and a Radio Unit (RU) according to an embodiment of the disclosure.

FIG. 10 illustrates an example of a connection between a DU and an RU according to an embodiment of the disclosure. The aforementioned embodiments according to the disclosure have been described under the premise that the base station 510 and the base station 530 perform Cooperative Multi-Point (CoMP) transmission. However, the embodiments according to the disclosure may also be applied among a plurality of RUs coupled to one DU.

Referring to FIG. 10, the DU may be coupled to the plurality of RUs. In this case, CoMP transmission may be performed among neighboring RUs out of the plurality of RUs since a coverage may overlap. For example, when a terminal located at a cell boundary of an O-RU #0 and an O-RU #1 is scheduled to the O-RU #1, the DU may transmit channel information and information on a nulling channel to the O-RU #0 so that a downlink signal transmitted by the O-RU #0 is adjusted to be beam-nulled in a direction for the terminal.

The DU may be coupled to various types of RUs. It is illustrated in the disclosure that the RU performs CoMP based on a nulling indicator. The DU according to embodiments of the disclosure may transmit the nulling indicator to the RU, and the RU may calculate a beamforming weight, based on a nulling layer depending on the nulling indicator, thereby performing MU-MIMO having a high performance gain. Both the RU and an RU not having a function may be coupled to the DU, and the DU identifies capability of this RU and does not transmit a nulling layer indicator to the RU, which may also be understood an embodiment of the disclosure. For example, the DU may receive a nulling capability report from a plurality of RUs coupled through a fronthaul. Based on the received nulling capability report, the DU may not establish an extended section to an RU not supporting a function of generating a beamforming weight by considering a nulling layer, thereby decreasing a fronthaul overhead.

In order to implement a Cooperative Beamforming (CB) which is one scheme of Cooperative Multi-Point (CoMP) transmission, a technique of configuring a section extension field including a parameter for a nulling layer in a section type 5 of a DU has been described with reference to FIGS.

1A, 1B, and 2 to 10. Specifically, referring to ORAN which is a standard for technical specifications, since a parameter indicating whether it is a nulling layer is not included in the section type 5 including information on a terminal scheduled to a layer on an RB, according to content of a current standard, it is not possible to implement a CB method. According to various embodiments of the disclosure, when performing CoMP transmission, a DU transmits to an RU a parameter indicating whether it is a nulling layer by including the parameter in the section type 5 for transmitting scheduling information, and the RU may null a beam for a terminal located at a cell boundary by applying a beamforming weight generated in a Zero-Forcing (ZF) manner to a downlink signal According to various embodiments of the disclosure, from a perspective of a terminal located at a cell boundary, Inter Cell Interference (IC) may be decreased and a throughput may be increased. From a perspective of a base station, interference between neighboring beams may be decreased by nulling one or more beams. Power supposed to be allocated to a nulling layer may be allocated to another layer, thereby improving transmission performance of the base station.

According to various embodiments of the disclosure, a method performed by a Digital Unit (DU) of a base station in a wireless communication system may include identifying a nulling layer and transmitting a first control message including information on the nulling layer to a Radio Unit (RU) of the base station.

The information on the nulling layer may indicate a layer on which a signal is not transmitted in Multi-User (MU) beamforming.

The first control message may further include scheduling information. The scheduling information may include resource allocation information on terminals scheduled to one or more layers of a Resource Block (RB). The one or more layers may further include the nulling layer.

The method may further include transmitting a second control message including downlink channel information on terminals in a coverage of the base station to the RU. The first control message and the second control message may be transmitted in a control plane.

The method may further include transmitting a third control message including a parameter for deactivating a layer nulling function to the RU. The third control message may be transmitted in a management plane.

According to various embodiments of the disclosure, a method performed by an RU of a base station in a wireless communication system may include receiving a first control message in which a section extension field is configured from a DU of the base station, receiving a second control message including downlink channel information on terminals in a coverage of the base station from the DU, calculating a Beamforming Weight (BFW), based on the first control message and the second control message, and transmitting a downlink signal, based on the BFW. The first control message may include scheduling information.

The scheduling information may include a parameter indicating one or more terminals scheduled to respective one or more layers of an RB. The section extension field may include a parameter indicating a nulling dimension of the one or more layers.

The calculating of the BFW, based on the first control message and the second control message, may include calculating the BFW in a Zero-Forcing (ZF) manner, based on the downlink channel information and the section extension field.

The first control message and the second control message may be received in a control plane.

The method may further include receiving a third control message including a parameter for deactivating a layer nulling function from the RU. The third control message may be received in a management plane.

According to various embodiments of the disclosure, a DU of a base station in a wireless communication system may include at least one transceiver and at least one processor operably coupled to the at least one transceiver. The at least one processor may be configured to identify a nulling layer and transmit a first control message including information on the nulling layer to an RU of the base station.

The information on the nulling layer may indicate a layer on which a signal is not transmitted in MU beamforming. According to an embodiment, the first control message may further include scheduling information. The scheduling information may include resource allocation information on terminals scheduled to one or more layers of an RB. The one or more layers may further include the nulling layer.

The at least one processor may be configured to transmit a second control message including downlink channel information for terminals in a coverage of the base station to the RU. The first control message and the second control message may be transmitted in a control plane.

The at least one processor may be configured such that a third control message including a parameter for deactivating a layer nulling function is transmitted in a management plane.

According to various embodiments of the disclosure, an RU of a base station in a wireless communication system may include at least one transceiver and at least one processor operably coupled to the at least one transceiver. The at least one processor may be configured to receive a first control message in which a section extension field is configured from a DU of the base station, receive a second control message including channel information on terminals in a coverage of the base station from the DU, calculate a BFW, based on the first control message and the second control message, and transmit a downlink signal, based on the BFW. The first control message may include scheduling information.

The scheduling information may include a parameter indicating one or more terminals scheduled to respective one or more layers of an RB. The section extension field may include a parameter indicating a nulling dimension of the one or more layers.

The at least one processor may be configured to calculate the BFW in a ZF manner, based on the downlink channel information and the section extension field.

The at least one processor may be configured to receive the first control message and the second control message in a control plane.

The at least one processor may be configured such that a third control message including a parameter for deactivating a layer nulling function is received in a management plane.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. A method performed by a distributed unit (DU) in a wireless communication system, the method comprising:
transmitting, to a radio unit (RU), a control message including information on a nulling layer for a user equipment (UE) identifier (ID) based beamforming, wherein a type of the control message is section type 5, wherein the information on the nulling layer is included in a section extension of the section type 5, and wherein the information on the nulling layer indicates whether a layer corresponding to the UE ID is the nulling layer.

2. The method of claim 1, wherein, when the layer corresponding to the UE ID is set to the nulling layer, a beamforming weight of the corresponding layer is configured to 0.

3. The method of claim 1, wherein a field length of the information on the nulling layer is 8 bits.

4. The method of claim 1, wherein the information on the nulling layer is indicated for each layer.

5. The method of claim 1,
wherein the control message further includes an extension flag (ef), an extension type (extType), and an extension length (extLen),

wherein a field length of the extension flag is 1 bit,
wherein the extension type includes a parameter indicating whether a layer is null, and
wherein the extension length includes at least one word.

6. A method performed by a radio unit (RU) in a wireless communication system, the method comprising:
receiving, from a distributed unit (DU), a control message including information on a nulling layer for a user equipment (UE) identifier (ID) based beamforming, wherein a type of the control message is section type 5; and
generating beamforming weights for UE IDs,
wherein the information on the nulling layer is included in a section extension of the section type 5, and
wherein the information on the nulling layer indicates whether a layer corresponding to the UE ID is a nulling layer.

7. The method of claim 6, wherein the generating of the beamforming weights further comprises, when a layer corresponding to the UE ID is configured as a nulling layer, generating a beamforming weight of the corresponding layer to be 0.

8. The method of claim 6, wherein a field length of the information on the nulling layer is 8 bits.

9. The method of claim 6, wherein the information on the nulling layer is indicated for each layer.

10. The method of claim 6,
wherein the control message further comprises an extension flag (ef), an extension type (extType), and an extension length (exLen),
wherein a field length of the extension flag is 1 bit,
wherein the extension type includes a parameter indicating whether a layer is nulled, and
wherein the extension length includes at least one word.

11. A distributed unit (DU) of a wireless communication system, the DU comprising:
a transceiver;
at least one processor; and
memory storing instructions that, when executed by the at least one processor, cause the DU to:
transmit, to a radio unit (RU), a control message including information on a nulling layer for a user equipment (UE) identifier (ID) based beamforming,
wherein a type of the control message is section type 5,
wherein the information on the nulling layer is included in a section extension of the section type 5, and
wherein the information on the nulling layer indicates whether a layer corresponding to the UE ID is the nulling layer.

12. The DU of claim 11,
wherein, when the layer corresponding to the UE ID is set to the nulling layer, a beamforming weight of the corresponding layer is configured to 0.

13. The DU of claim 11,
wherein a field length of the information on the nulling layer is 8 bits, and
wherein the information on the nulling layer is indicated for each layer.

14. The DU of claim 11,
wherein the control message further includes an extension flag (ef), an extension type (extType), and an extension length (extLen),
wherein a field length of the extension flag is 1 bit,
wherein the extension type includes a parameter indicating whether a layer is null, and
wherein the extension length includes at least one word.

15. A radio unit (RU) of a wireless communication system, the RU comprising:

a transceiver;

at least one processor; and memory storing instructions that, when executed by the at least one processor, cause the RU to:

receive, from a distributed unit (DU), a control message including information on a nulling layer for a user equipment (UE) identifier (ID) based beamforming, wherein a type of the control message is section type 5, and generate beamforming weights for UE IDs, wherein the information on the nulling layer is included in a section extension of the section type 5, and wherein the information on the nulling layer indicates whether a layer corresponding to the UE ID is a nulling layer.

16. The RU of claim 15, wherein the generating of the beamforming weights further comprises, when a layer corresponding to the UE ID is configured as a nulling layer, generating a beamforming weight of the corresponding layer to be 0.

17. The RU of claim 15, wherein a field length of the information on the nulling layer is 8 bits, and wherein the information on the nulling layer is indicated for each layer.

18. The RU of claim 15, wherein the control message further comprises an extension flag (ef), an extension type (extType), and an extension length (exLen), wherein a field length of the extension flag is 1 bit, wherein the extension type includes a parameter indicating whether a layer is nulled, and wherein the extension length includes at least one word.

* * * * *